(12) United States Patent
Yoshiuchi

(10) Patent No.: US 10,889,001 B2
(45) Date of Patent: Jan. 12, 2021

(54) SERVICE PROVISION SYSTEM

(71) Applicant: HITACHI, LTD., Tokyo (JP)

(72) Inventor: Hideya Yoshiuchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 389 days.

(21) Appl. No.: 15/918,486

(22) Filed: Mar. 12, 2018

(65) Prior Publication Data
US 2018/0326593 A1 Nov. 15, 2018

(30) Foreign Application Priority Data

May 10, 2017 (JP) ................................. 2017-093569

(51) Int. Cl.
| | |
|---|---|
| *B25J 13/06* | (2006.01) |
| *B25J 13/00* | (2006.01) |
| *B25J 9/00* | (2006.01) |
| *G05D 1/00* | (2006.01) |
| *G05D 1/02* | (2020.01) |
| *B25J 9/16* | (2006.01) |

(52) U.S. Cl.
CPC .......... *B25J 13/006* (2013.01); *B25J 9/0003* (2013.01); *B25J 9/162* (2013.01); *G05D 1/0011* (2013.01); *G05D 1/0022* (2013.01); *G05D 1/0276* (2013.01); *Y10S 901/01* (2013.01)

(58) Field of Classification Search
CPC ........ B25J 13/006; B25J 9/0003; B25J 9/162; G01C 21/12; G05D 1/0011; G05D 1/0022; G05D 1/0276; Y10S 901/01
See application file for complete search history.

(56) References Cited

U.S. PATENT DOCUMENTS

| | | | |
|---|---|---|---|
| 2005/0070335 A1 | 3/2005 | Jitsuishi et al. | |
| 2010/0286826 A1* | 11/2010 | Tsusaka | B25J 9/1633 700/254 |
| 2013/0261796 A1* | 10/2013 | Park | B25J 9/1617 700/245 |
| 2016/0225264 A1* | 8/2016 | Taveira | G08G 5/0013 |
| 2016/0253907 A1* | 9/2016 | Taveira | G05D 1/106 701/3 |
| 2016/0285874 A1* | 9/2016 | Smith | H04L 61/2589 |
| 2017/0225336 A1* | 8/2017 | Deyle | G08B 13/196 |
| 2017/0344017 A1* | 11/2017 | Liu | G05D 1/028 |
| 2017/0361468 A1* | 12/2017 | Cheuvront | G06F 3/01 |
| 2018/0241255 A1* | 8/2018 | Leabman | H02J 50/40 |

FOREIGN PATENT DOCUMENTS

| | | |
|---|---|---|
| JP | 2004-255520 A | 9/2004 |
| JP | 2005-109745 A | 4/2005 |

* cited by examiner

*Primary Examiner* — Bhavesh V Amin
(74) *Attorney, Agent, or Firm* — Volpe Koenig

(57) ABSTRACT

In a service provision system utilizing a movable device such as a robot, a service is realized, in which an external service device installed at a service location and the movable device cooperate with each other. A position of the movable device as well as an installation position and an availability range of the service devices are managed at a service provision location; when the movable device provides a service, an availability of a service device necessary for the service is determined, and when there is a service device not available, the robot is moved to a position where the service device becomes available.

12 Claims, 15 Drawing Sheets

Fig. 3

2 Robot

21 Robot control terminal

20 Network interface

26 Internal storage apparatus
- 261 Robot control program
- 263 Service scenario control program
- 265 Robot state DB
- 267 Service device information DB 22 Control unit (CPU)

24 External storage apparatus

28 Bus

29 External input/output interface

291 Camera
292 Motor
293 Microphone
294 Speaker
295 Actuator
296 Various sensors

| Robot state DB | | | |
|---|---|---|---|
| Location identifier | Location map | X coordinate | Y coordinate |

267

| Service device information DB | | | | | | |
|---|---|---|---|---|---|---|
| Device identifier | Device type | X coordinate | Y coordinate | Device control parameter 1 | ... | Device control parameter N |

| Service information DB | | | | |
|---|---|---|---|---|
| Service identifier | Location identifier | Device identifier 1 | ... | Device identifier N |

Fig. 14

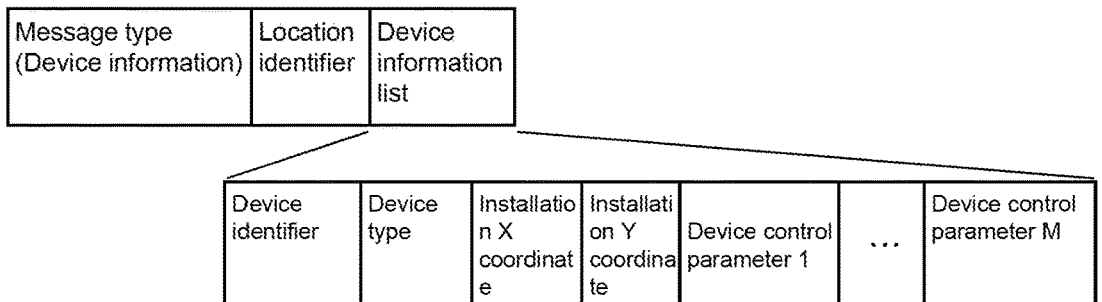

PF-01

| Message type (Device information request 1) | Location identifier | Robot identifier | Robot X coordinate | Robot Y coordinate |

PF-02

| Message type (Device information) | Location identifier | Device information list |

| Device identifier | Device type | Installation X coordinate | Installation Y coordinate | Device control parameter 1 | ... | Device control parameter M |

PF-03

| Message type (Service information request) | Location identifier | Service identifier | Robot identifier |

PF-04

| Message type (Service information) | Location identifier | Service identifier | Device identifier 1 | ... | Device identifier N |

PF-05

| Message type (Robot position control) | Location identifier | Robot identifier | Motion control command 1 | ... | Motion control command N |

PF-06

| Message type (Service device control) | Location identifier | Device identifier | Device control parameter 1 | ... | Device control parameter M |

PF-07

| Message type (Robot position control request) | Location identifier | Robot identifier | Robot X coordinate | Robot Y coordinate | Device identifier 1 | ... | Device identifier N |

PF-08

| Message type (Device information request 2) | Location identifier | Robot identifier | Device identifier 1 | ... | Device identifier N |

SERVICE PROVISION SYSTEM

This application claims priority based on Japanese patent application, No. 2017-093569 filed on May 10, 2017, the entire contents of which are incorporated herein by reference.

BACKGROUND

The disclosed subject matter relates to cooperation between a movable device, such as a robot, and a service device.

Internet of Things (IoT) technology which connects all devices to the Internet and provides a diverse range of services is becoming widespread. As the number of devices connected to the Internet rapidly increases, technological developments of service provision systems in which a robot provides a person with various services through communication are being made. While a robot is equipped with a locomotive function enabled by a motor, an actuator, and the like, devices that can be mounted to the robot are limited due to constraints of a body of the robot such as a size and a shape thereof. For example, mounting a display device such as a large-size display to a robot requires that the robot itself is also large, and constraints also arise with respect to a size and a location of mountable displays. In consideration thereof, in order to make a device that is not easily mountable to a robot available in a service provision system, a method is conceivable which involves installing a device to be used for service provision (referred to as a service device) outside of a robot and having the robot control the service device.

As a technique related to this method, Japanese Patent Application Laid-open No. 2005-109745 discloses a device retrieval technique in which surrounding external devices are searched and notified to a user. In addition, Japanese Patent Application Laid-open No. 2004-255520 discloses an external device cooperation technique in which an external device is used to display an internal state of a robot.

SUMMARY

When causing a movable information processing apparatus (hereinafter, referred to as a movable device) such as robot and an external device used for service provision (hereinafter, referred to as a service device) to cooperate with each other, constraints due to a positional relationship between a movable device body and the service device must be taken into consideration. For example, in a state where the movable device and the service device are physically separated from each other, displaying some kind of information on a screen using a display device such as a display is meaningless to a user of the system.

Therefore, a service provision system which takes a correlation between a movable device and a service device into consideration is desired.

An aspect disclosed in the present specification is a service provision system in which, at a location where one or more service devices are installed, the service devices and a movable device cooperate with each other to provide a user with a service.

The service provision system described above includes a service control server configured to manage device information on the service devices.

The movable device is configured to request, from the service control server, device information indicating a service device available to the movable device in a state of the movable device indicated by state information, the service control server is configured to acquire the device information in the state of the movable device and respond to the movable device with the acquired device information, and the movable device is configured to manage the acquired device information.

In addition, the service provision system may include an operation management server configured to manage service information indicating a service device necessary for service provision with respect to one or more services.

The movable device may be configured to request, from the operation management server, the service information related to a specific service, the operation management server may be configured to respond to the movable device with the service information, and the movable device may be configured to determine, based on the service information and the device information, whether or not the specific service can be provided in a state of the movable device.

Furthermore, the service provision system may include a device control server configured to control a specific service device necessary for provision of the specific service.

The movable device may be configured to request, when a result of the determination indicates that the specific service can be provided, control of the specific service device from the device control server, and the device control server may be configured to control the specific service device in accordance with the request.

In addition, in the service provision system, the movable device may be configured to request, when a result of the determination indicates that the specific service cannot be provided, device information on a specific service device necessary for provision of the specific service, from the service control server, the service control server may be configured to respond to the movable device with device information on a specific service device necessary for provision of the specific service, the movable device may be configured to request position control information on the movable device, based on the responded device information on the service device, from the service control server, the service control server may be configured to generate position control information on the movable device and respond to the movable device with the position control information, and the movable device may be configured to change a state of the movable device so that the specific service can be provided.

According to the configuration described above, using a positional relationship between a position of a movable device and a service device and a use range of the service device, the movable device is provided with a list of service devices available to the movable device. Service devices necessary for service provision are collated with service devices available to the movable device, and a determination is made on whether or not the service devices necessary for service provision can be used by the movable device. When there is a service device not available to the movable device, service provision becomes possible by moving the movable device to a position where the service device necessary for service provision becomes available.

The disclosed service provision system makes service devices installed outside of a movable device available, increases services that can be provided, and improves quality of individual services.

The details of one or more implementations of the subject matter described in the specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 exemplifies a block diagram showing a structure of a robot;

FIG. 4 exemplifies a block diagram showing a structure of data managed by a robot;

FIG. 6 exemplifies a block diagram showing a structure of data managed by an operation management server;

FIG. 14 exemplifies an explanatory diagram of a message format; and

DETAILED DESCRIPTION OF THE EMBODIMENTS

Figure 1:
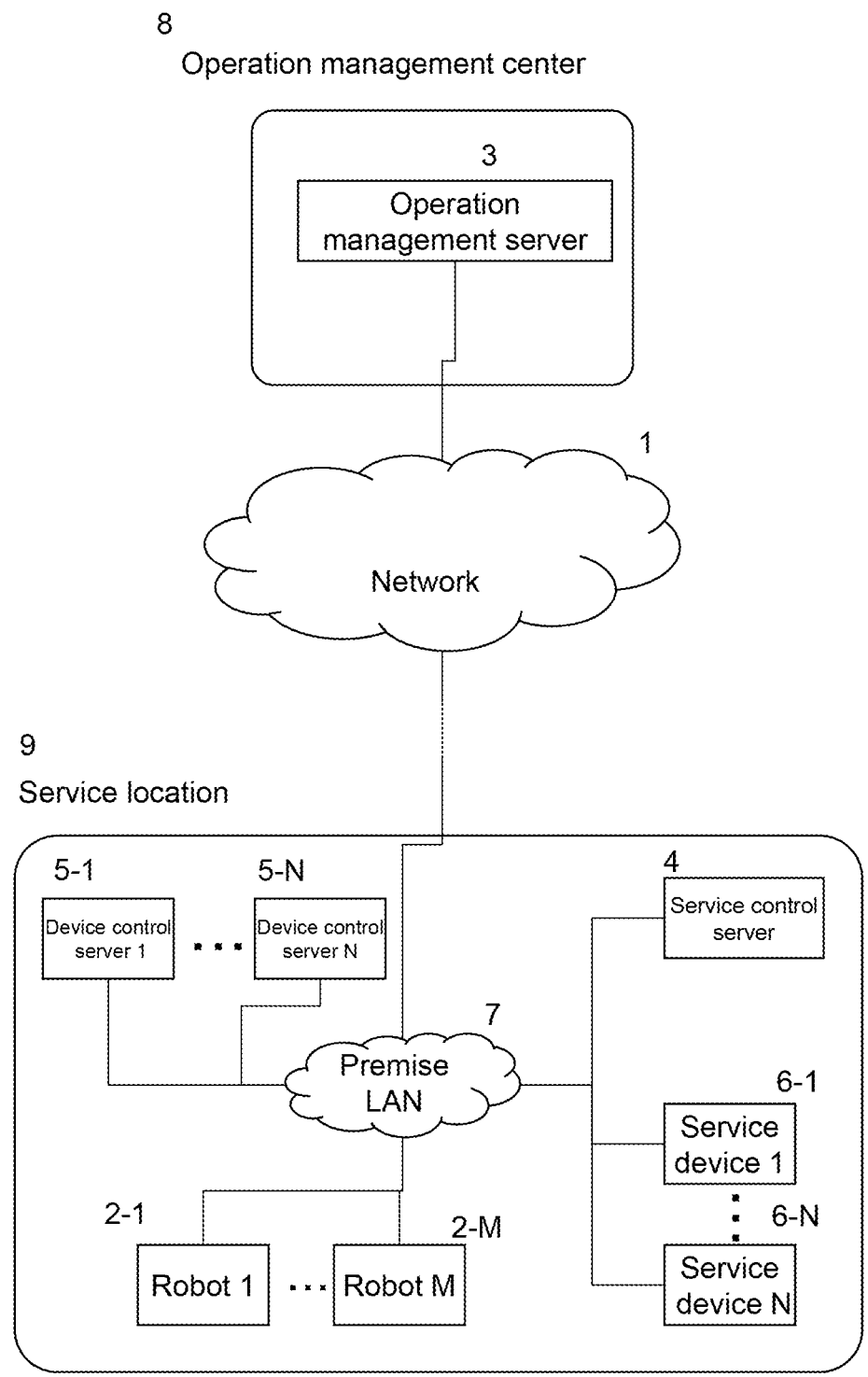
FIG. 1 exemplifies a block diagram of a service provision system for a movable body according to an embodiment.

Hereinafter, an embodiment of the present invention will be described with reference to the drawings. FIG. 1 represents an example of a configuration of a service provision system for a movable device according to the present embodiment which can be applied to, for example, a service provision system in which a movable device cooperates with various service devices present at a service location (also simply referred to as a location).

The service provision system for a movable device includes a service location 9 where a movable device is installed and an operation management center 8 where an operation management server 3 which manages the system is installed, and the service location 9 and the operation management center 8 are coupled to each other by a network 1. A movable device which plays a major role in service provision is installed at the service location 9. A location refers to a facility such as a station, an airport, and a shopping center. The operation management center 8 may be installed inside a same facility as the location, installed at a place separated from the location, installed at a data center, or installed in the cloud.

While movable devices come in various modes, robots (2-1 to 2-M, hereinafter collectively referred to as a robot 2) capable of autonomous locomotion will be considered in the following description. Moreover, movable devices are not limited to robots and also include devices capable of long-range travel such as flying objects referred to as drones and self-driving cars.

The robot 2 includes a control terminal 21 and executes mechanism control and service control of the robot itself. The control terminal 21 of the robot 2 is not actually specialized for executing applications as is the case with a server and has limited computer resources such as a CPU, an internal storage (a memory), and an external storage which are usable for executing applications. Therefore, many services are executed via a service control server 4 installed outside of the robot 2. The service control server 4 is installed at the service location 9 and coupled to the robot 2 by a premise LAN 7.

In the service location 9, in order to improve mobility of the robot 2, radio is desirably used as a medium of the premise LAN 7 which connects the robot 2 to other apparatuses.

Figure 2:
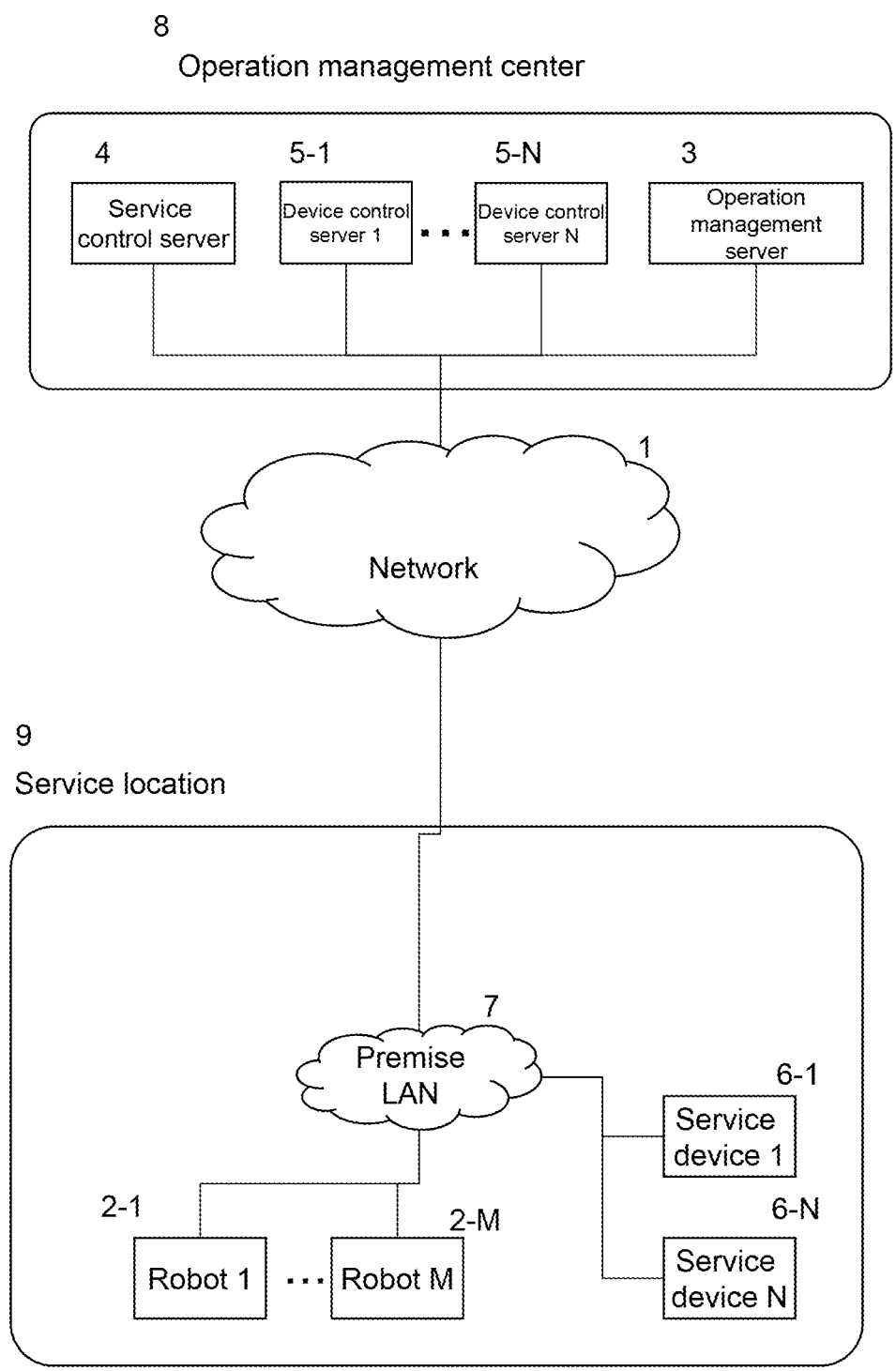
FIG. 2 exemplifies a block diagram of a service provision system for a movable body according to another embodiment.

FIG. 2 shows a system configuration in a case where various servers are installed at the operation management center 8. While the service control server 4 and a device control server 5 can be installed at the service location 9 if the service location 9 has a dedicated server room or the like for installing IT devices, in some cases, the service location 9 does not allow the installation of servers. In such a case, the service control server 4 and the device control servers (5-1 to 5-N) are installed at the operation management center 8.

Next, the respective apparatuses constituting the system will be described in detail. FIG. 3 shows an apparatus structure of the robot 2. The robot 2 is configured to include a robot control terminal 21 and devices provided in the robot. Examples of such devices include a camera 291, a motor 292, a microphone 293, a speaker 294, an actuator 295, and various sensors 296. Each device is coupled to and controlled by the robot control terminal 21 via an external input/output interface 29 of the robot control terminal 21.

The robot control terminal 21 can be realized using a computer. Specifically, the robot control terminal 21 is equipped with a control unit (CPU) 22, an internal storage apparatus 26 such as a memory, an external storage apparatus 24 such as a hard disk or an SSD (Solid State Disk), and a network interface 20 all coupled to an internal signal line (hereinafter, referred to as a bus) 28 such as a bus and communicates with the outside via the network interface 20.

The internal storage apparatus 26 includes a robot control program 261 which realizes mechanism control such as control of a mechanism, a posture, and a movement of the robot and a service scenario control program 263 which realizes service control. In addition to these application programs, the robot 2 includes a robot state database (DB) 265 which manages information regarding the state of the robot (referred to as state information) and a service device information DB 267 which manages service devices available to the robot. The respective databases may be stored in the external storage apparatus 24 depending on a scale of the system, a processing performance of the robot control terminal 21, and the like.

As the control unit (CPU) 22 executes the robot control program 261 and the service scenario control program 263 stored in the internal storage apparatus 26, mechanism control of the robot 2, access to the respective databases, and service control are realized.

FIG. 4 represents structures of the various databases present in the internal storage apparatus 26 of the robot 2.

The robot state DB 265 is a database which manages state information on the robot itself and includes a location identifier of the service location 9 where the robot 2 is installed, a location map, and an X coordinate and a Y coordinate of the robot 2 in the map. The location identifier is an identifier which uniquely identifies a location and, at the simplest level, specifies a name of the location or a character string or the like configured in accordance with a naming convention of the system. The location map is information regarding a physical structure of a location such as a shape, an area, and a layout of the service location 9, and initial configuration of the information is performed upon installation of the robot 2. The robot 2 has a self-position estimation function and is capable of determining its own position (X coordinate, Y coordinate) in the service location 9 by measuring distances between surrounding walls and the robot 2 itself using a laser range finder or the like.

The service device information DB 267 is a database which manages information (referred to as device information) regarding zero or more service devices 6 available to the robot 2 and includes, per entry, a device identifier which uniquely specifies a service device 6, a device type which represents a type of the device, an X coordinate and a Y coordinate of a position where the service device 6 is installed in the service location 8, and a list of parameters available for controlling the service device (device control parameter 1 to device control parameter N).

Contents of device control parameters vary depending on a type of the target service device 6. For example, when the service device is an output device such as digital signage, an on/off setting of a screen, an identifier of contents to be displayed on the screen, and a display position (a page number, a URL, or the like) in the contents are specified as device control parameters. When the service device is a camera, an angle (pan or tilt) of the camera can be configured as a device control parameter. When the service device is an elevator, a move request to the elevator and a specification of a floor are conceivable as device control parameters.

Figure 5:
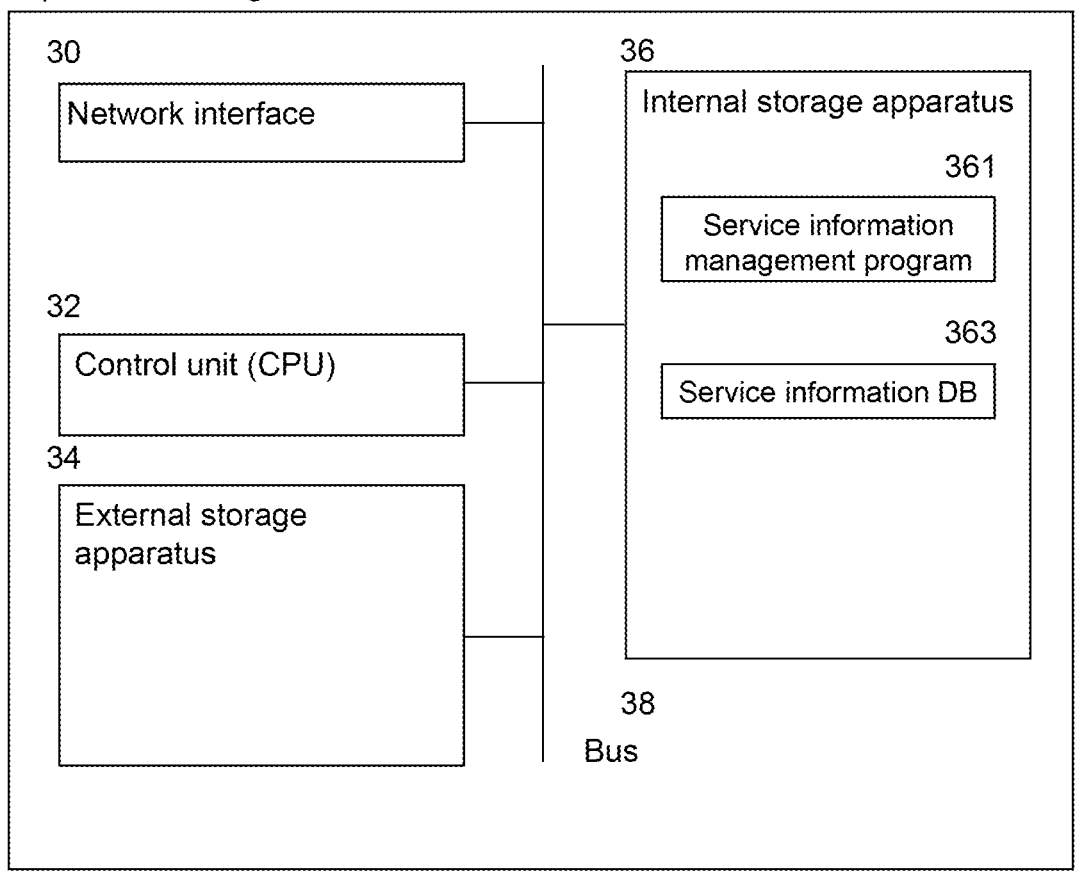
FIG. 5 exemplifies a block diagram showing a structure of an operation management server.

FIG. 5 shows an apparatus structure of the operation management server 3. The operation management server 3 is equipped with a control unit (CPU) 32, an internal storage apparatus 36 such as a memory, an external storage apparatus 34 such as a hard disk, and a network interface 30 all coupled to a bus 38, and communicates with the outside via the network interface 30. The internal storage apparatus 36 includes a service information management program 361 which manages service information on the entire system and a service information DB 363 which stores service information. The service information management program 361 is installed on the external storage apparatus 34 and is started up when necessary by the control unit (CPU) 32. In addition, the service information DB 363 may be stored in the external storage apparatus 34 depending on the scale of the system, a processing performance of the operation management server 3, and the like. Read and write from and to the service information DB 363 are performed by the service information management program 361 installed on the internal storage apparatus 36. The operation management server 3 realizes an operation management process of the system as the control unit (CPU) 32 executes the service information management program 361 stored in the internal storage apparatus 36.

FIG. 6 represents a structure of the databases present in the internal storage apparatus 36 of the operation management server 3. The service information DB 363 is a database which manages device information on services available to the user for each service location 9 and includes a service identifier which uniquely specifies a service in the system, a location identifier which uniquely specifies the service location 9, and a list of device identifiers which specify devices necessary for service provision (device identifier 1 to device identifier N). The robot is provided with these pieces of information as necessary in response to a request from the robot.

Figure 7:
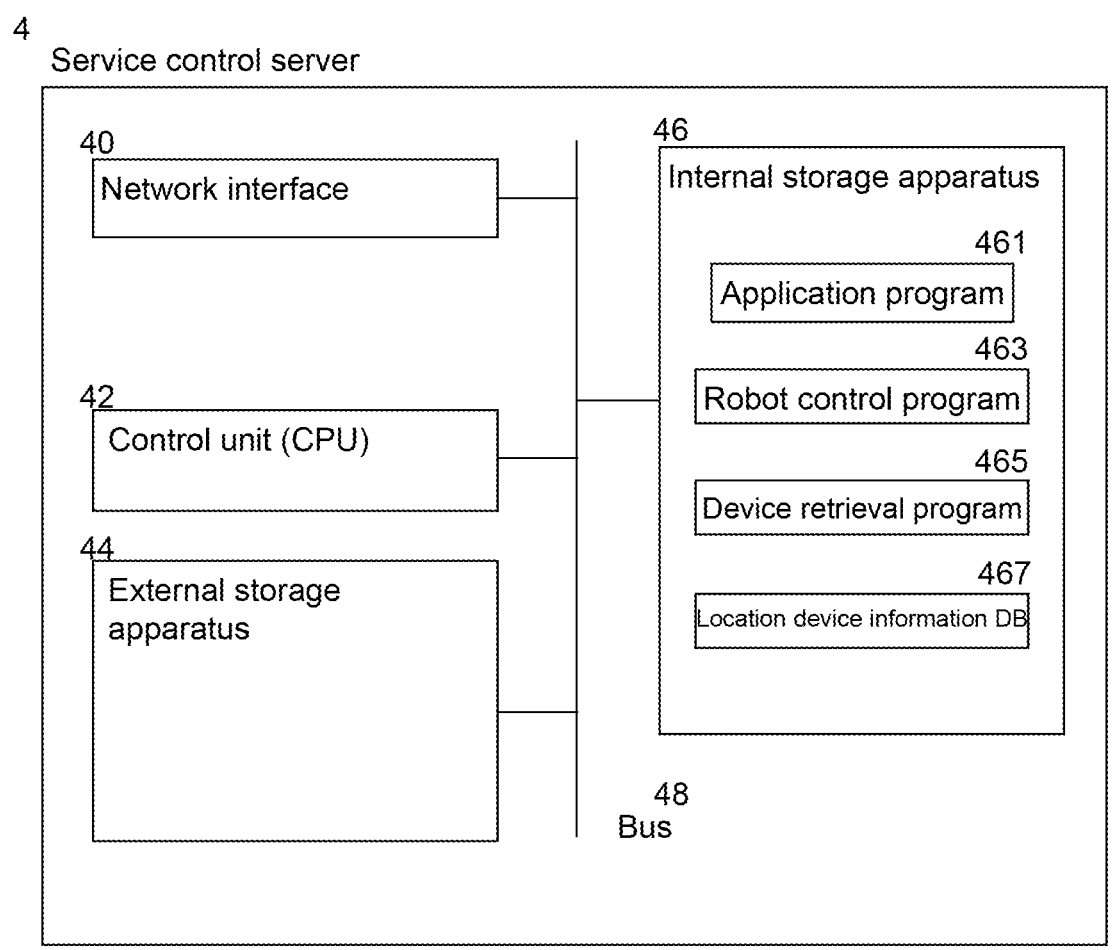
FIG. 7 exemplifies a block diagram showing a structure of a service control server.

FIG. 7 shows an apparatus structure of the service control server 4. The service control server 4 is equipped with a control unit (CPU) 42, an internal storage apparatus 46 such as a memory, an external storage apparatus 44 such as a hard disk, and a network interface 40 all coupled to a bus 48, and communicates with the outside via the network interface 40. The internal storage apparatus 46 includes an application program 461 which provides a service, a robot control program 463 which performs mechanism control including a movement and a rotation of the robot 2, and a device retrieval program 465 which performs a search of service devices 6 available to the robot 2 using positional information on the robot 2. The respective programs are installed on the external storage apparatus 44 and are started up by the control unit (CPU) 42 upon start of operation of the system. In addition to these programs, the service control server 4 includes a location device information DB 467 which manages device information on the service devices 6 installed at the service location 9. The location device information DB 467 may be stored in the external storage apparatus 44 depending on the scale of the system, a processing performance of the service control server 4, and the like. Read and write from and to the location device information DB 467 are performed by the respective programs installed on the internal storage apparatus 46. The service control server 4 realizes a service control process as the control unit (CPU) 42 executes the application program 461, the robot control program 463, and the device retrieval program stored in the internal storage apparatus 46.

Figure 8:
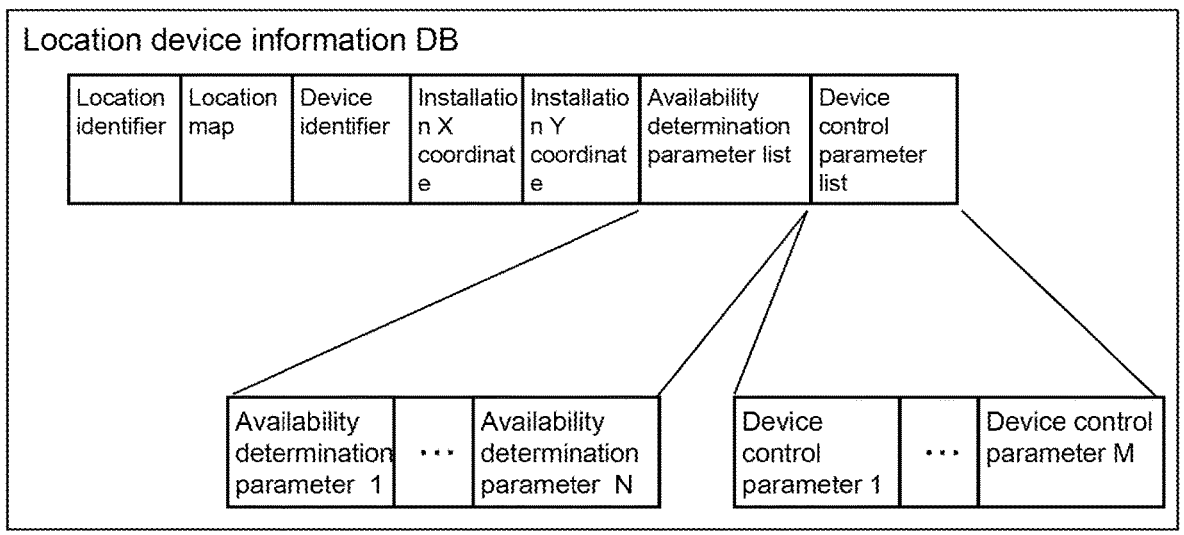
FIG. 8 exemplifies a block diagram showing a structure of data managed by a service control server.

FIG. 8 represents a structure of the location device information DE 467 present in the internal storage apparatus 46 of the service control server 4. The location device information DB 467 is a database which manages device information on the service devices 6 installed at the service location 9, and includes a location identifier which uniquely specifies the service location 9, a location map which represents a layout of the service location 9, a device identifier which uniquely specifies a service device 6, an X coordinate and a Y coordinate representing a position where the service device 6 is installed at the service location 9, a list of availability determination parameters used in availability determination of the service device 6, and a list of device control parameters used for controlling the service device 6. The availability determination parameter list includes zero or more availability determination parameters. The device control parameter list includes one or more device control parameters. Examples of the device control parameter include a stopping floor of an elevator and image quality (a frame rate, a bit rate, or the like) of a camera.

The availability determination parameter is a parameter used in order to determine states of the robot 2 and the service device 6 and to determine the availability of the service device 6. Typically, a parameter regaarding a positional relationship between the robot 2 and the service device 6 and a parameter regarding a quality of the service device 6 correspond to availability determination parameters.

Figure 15:
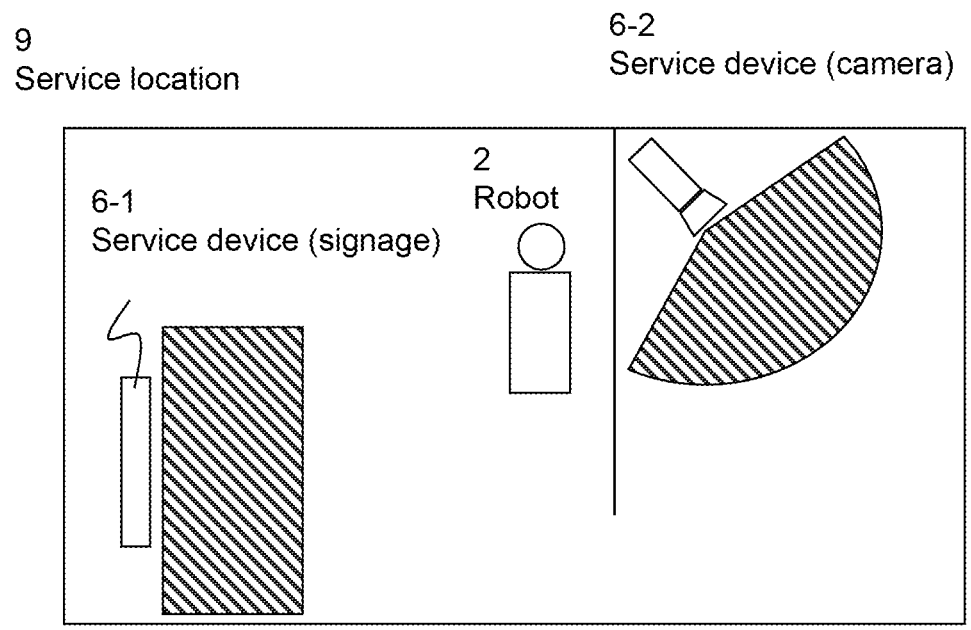
FIG. 15 exemplifies a concept of availability determination of a service device.

An example of availability determination of the service device 6 will be described using FIG. 15. FIG. 15 represents an example of a service location 9 having two rooms partitioned by a wall, and the robot 2 as well as a signage (6-1) and a camera (6-2) as two service devices 6 are installed at the service location 9. Respective service available areas of the signage (6-1) and the camera (6-2) are indicated as hatched areas.

In order for the robot 2 to perform information provision to a person using the signage (6-1), a distance between the robot 2 and the signage (6-1) must be equal to or shorter than a certain distance. In such a case, without having to specify service availability determination parameters, the availability of a device may be determined in a simplified manner only using X and Y coordinates of the robot and X and Y coordinates of the signage or service availability may be determined by configuring a service available area indicated by a hatched area in front of the signage (6-1) using means such as a mathematical expression.

On the other hand, in the case of the camera (6-2), while the robot 2 and the camera (6-2) are in proximity to each other in FIG. 15, since the robot 2 and the camera (6-2) are in proximity with a wall therebetween, the camera (6-2) does not become available when the camera (6-2) needs to be photographing the robot 2. In such a case, conceivably, a photographable area may be configured as an availability determination parameter in front of the camera and the camera (6-2) may be determined to be available as a service device when the robot 2 is in the photographable area of the camera (6-2). In addition, from the perspective of image quality of the camera, the camera is determined to be unavailable when the device control parameter of the camera in operation does not satisfy a quality necessary for service.

However, the camera (6-2) is not always considered unavailable when the robot 2 is not in the photographable area of the camera (6-2), and there may be cases where the camera is necessary for purely checking peripheral circumstances. In such a case, by allocating a plurality of device identifiers to the camera (6-2) and virtually allocating two devices, namely, a device for which an availability determination parameter is configured and a device for which an availability determination parameter is not configured, the processes can be distributed.

Since contents of the device control parameters are similar to those of the device control parameters included in the service device information DB 267 shown in FIG. 4, a description thereof will be omitted.

Figure 9:
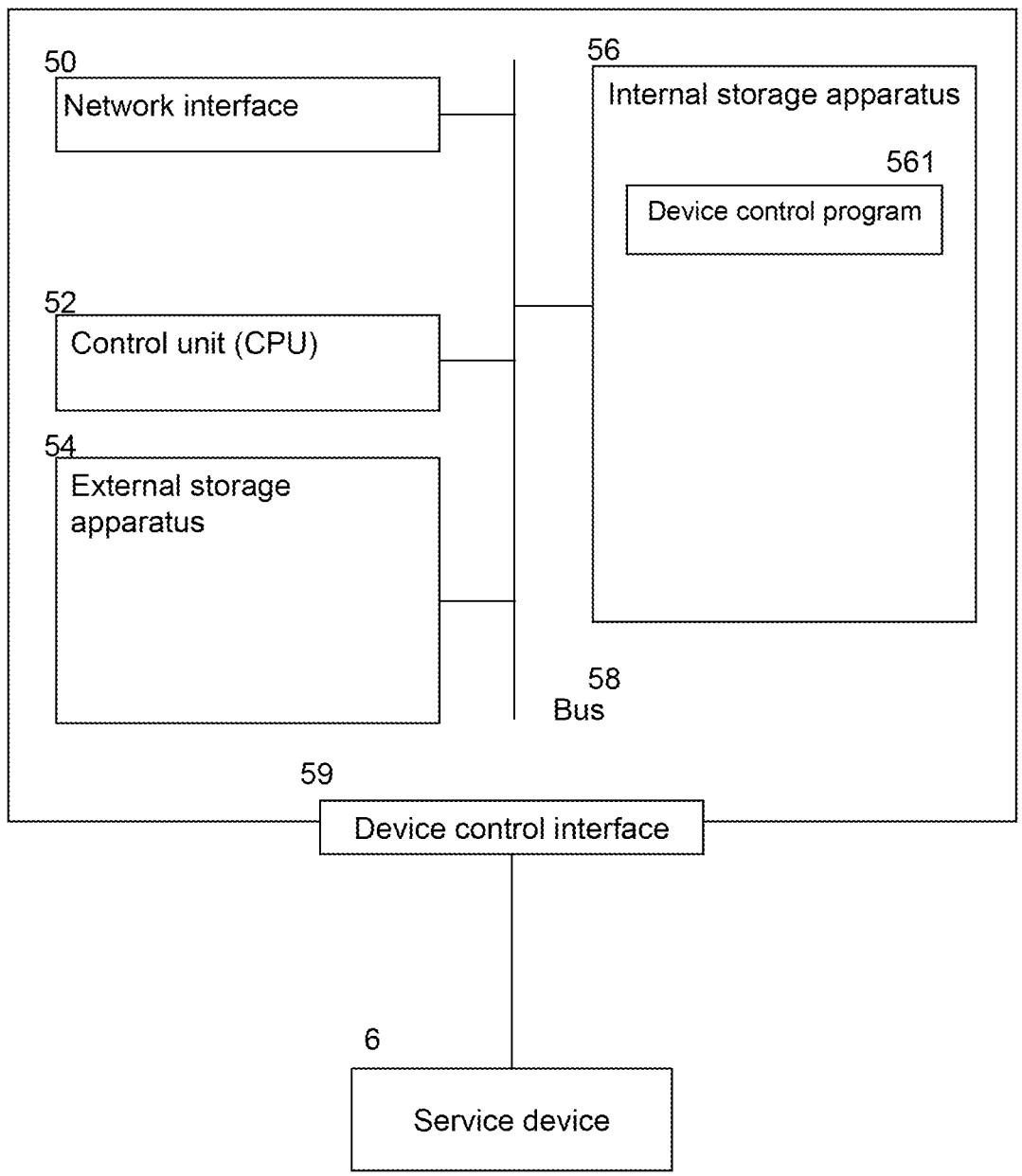
FIG. 9 exemplifies a block diagram showing a structure of a device control server.

FIG. 9 shows an apparatus structure of the device control server 5. The device control server 5 is equipped with a control unit (CPU) 52, an internal storage apparatus 56 such as a memory, an external storage apparatus 54 such as a hard disk, and a network interface 50 all coupled to a bus 58 as well as a device control interface 59 which is coupled to the service device 6 in order to control the service device 6, and communicates with the outside via the network interface 50. The internal storage apparatus 56 includes a device control program 561 which controls a service device in accordance with device control parameters.

The device control server 5 realizes a control process of a service device as the control unit (CPU) 52 executes the device control program 561 stored in the internal storage apparatus 56.

Moreover, the device control server 5 and the service device 6 need not necessarily be coupled via the device control interface 59. When the service device 6 has a communication function as represented by an IP camera and the like, the device control server 5 controls the service device 6 via the network interface 50. As an alternative mounting method, the robot 2 may directly control the service device 6.

Figure 10:
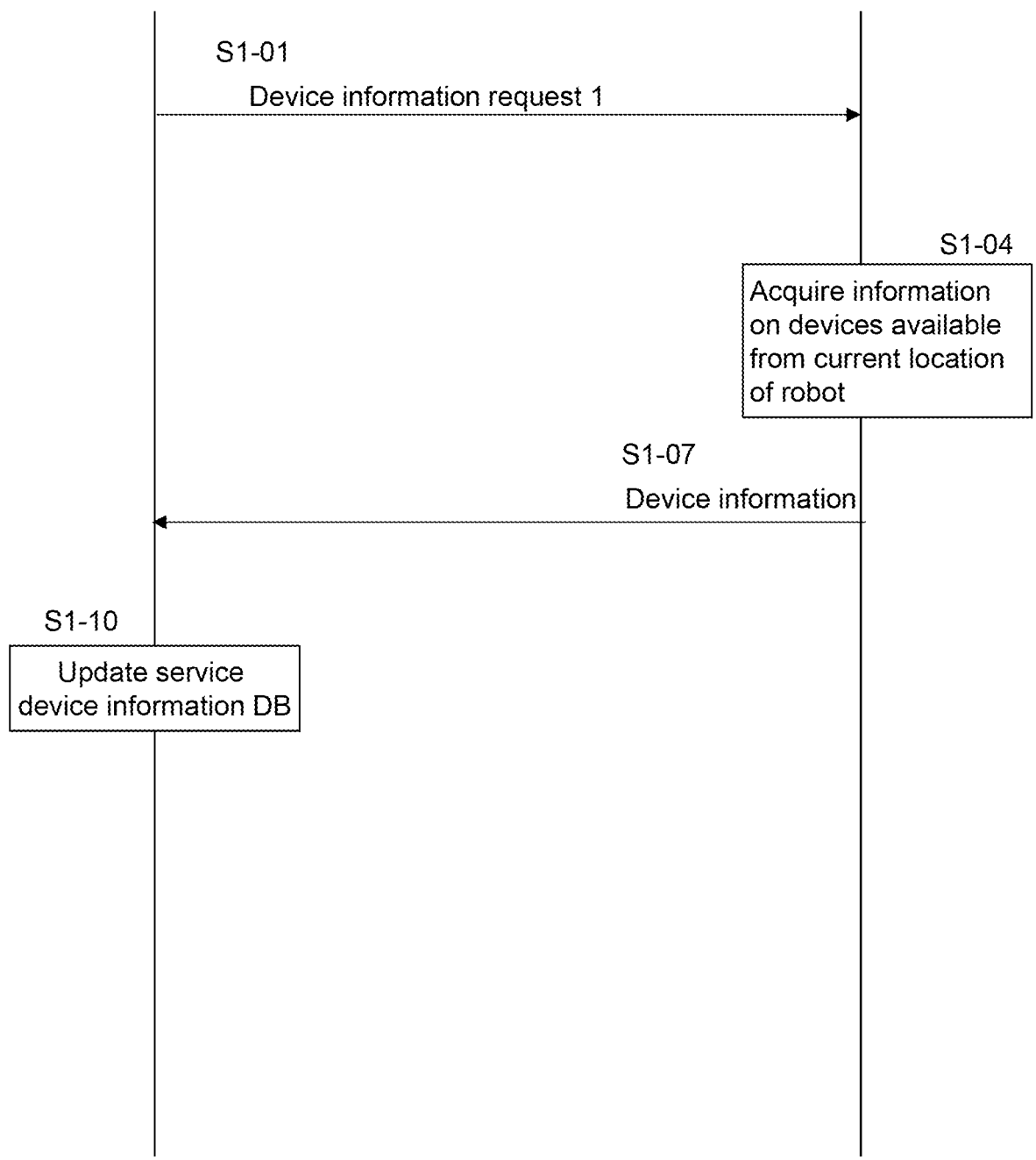
FIG. 10 exemplifies a time-sequence diagram 1 for explaining a service device control process according to an embodiment.

Next, operations of the entire service provision system for a movable device according to the present embodiment will be described. First, a process by which the robot 2 acquires and manages a list of service devices available to the robot 2 will be described using the time-sequence diagram shown in FIG. 10.

The robot control program 261 of the robot 2 repetitively updates a list of service devices available to the robot 2 itself and manages the list with the service device information DB 267. To this end, the robot 2 transmits a device information request 1 to the service control server 4 (S1-01).

A format of the device information request 1 (PF-01) is as shown in FIG. 14 and includes, as elements, a message type (the device information request 1), a location identifier representing the service location 9 where the robot 2 is in operation, a robot identifier which uniquely specifies the robot 2, and an X coordinate and a Y coordinate of the robot 2.

The device retrieval program 465 of the service control server 4 having received the device information request collates the X coordinate and the Y coordinate of the robot 2 with the location device information DB 467 and extracts a list of service devices 6 available to the robot 2 using an availability determination method such as that shown in FIG. 15. The service control server 4 transmits the extracted list as device information to the robot 2 (S1-07).

A format of device information (PF-02) is shown in FIG. 14. Device information includes, as elements, a message type (device information), a location identifier representing the service location 9 where the robot 2 is in operation, and a list of device information on service devices 6 available to the robot 2. The device information list includes a device identifier which uniquely specifies a service device 6, a device type which represents a type of the device, an X coordinate and a Y coordinate representing an installation position of the service device 6 in the service location 9, and a list of device control parameters available for device control.

The robot control program 261 of the robot 2 having received the device information updates the service device information DB 267 of the robot 2 based on the received information (S1-10).

The robot 2 provides a user with a service by having its own devices such as a camera cooperate with service devices. A process of providing a service by having devices cooperate with each other will be described using FIG. 11.

The service scenario control program 263 of the robot 2 starts provision of a service based on a service scenario using a result of a conversation with the user, sensor data, or the like as a trigger (S2-01). For example, when the robot 2 is asked a question regarding a commercial facility by a customer at the facility, the robot 2 starts a facility guidance service.

First, in order to discern service devices necessary for providing a target service, the service scenario control program 263 of the robot 2 transmits a service information request to the operation management server 3 (S2-04). A format of the service information request (PF-03) is shown in FIG. 14. The service information request includes, as elements, a message type (service information request), a location identifier representing the service location 9 where the robot 2 is in operation, a service identifier which uniquely specifies a service of which provision is to be started by the robot 2, and a robot identifier of the robot 2.

The service information management program 361 of the operation management server 3 having received the service information request searches the service information DB 363 using the service identifier included in the service information request and creates a list of device identifiers of the service devices 6 required by the requested service. Subsequently, the service information management program 361 of the operation management server 3 configures service information using the list of device identifiers and transmits the service information to the robot 2 (S2-07).

A format of the service information (PF-04) is shown in FIG. 14. The service information includes, as elements, a message type (service information), a location identifier representing the service location 9 where the robot 2 is in operation, a service identifier which uniquely specifies a service of which provision is to be started by the robot 2, and st of device identifiers specifying service devices necessary for service provision (device identifier 1 to device identifier N).

The service scenario control program 263 of the robot 2 having received the service information collates the list of device identifiers included in the service information with all device identifiers included in the service device information DB 267 and determines whether or not the service can be provided. Let us now assume that the device identifiers in the list included in the service information are all included in the device identifiers managed by the service device information DB 267 (S2-10). This means that the devices necessary for service provision are available and the service can be provided, and represents that preparations for service provision have been completed. Therefore, the service scenario control program 263 of the robot 2 requests service device control for controlling the service devices 6 necessary for service provision to the device control server 5 (S2-13).

A format of the service device control request (PF-06) is shown in FIG. 14. The service device control request includes, as elements, a message type (service device control), a location identifier representing the service location 9 where the robot 2 is in operation, a service identifier which uniquely specifies a service of which provision is to be started by the robot 2, a device identifier which identifies the service device 6 that is a control target, and a list of device control parameters used to control the service device that is the control target (device control parameter 1 to device control Parameter M).

The device control program 561 of the device control server 5 controls, based on the received device control parameters, the corresponding service device 6 (S2-16). Due to the process described above, the robot 2 can provide the user with a service using external service devices.

When providing a service, necessary service devices 6 are not always available to the robot 2 and, in some cases, a part of the devices may be unavailable.

In the example shown in FIG. 15, since the robot 2 is at a distance from the signage (6-1) and is positioned outside of the service available area of the signage (6-1), the robot 2 cannot provide the user with a service using the signage (6-1). When the service device 6 is a device installed in a fixed manner at a service facility 9 such as a signage and an elevator, since it is difficult to move the devices, a position of the robot 2 must be controlled to create a state where the service device 6 becomes available.

In addition to restrictions due to a positional relationship, there are cases where a service device such as the camera (6-2) has parameters such as image quality which do not meet a requested service quality and, in such cases, the quality (image quality or the like) necessary for the service quality must be secured by controlling the service device.

Figure 12:
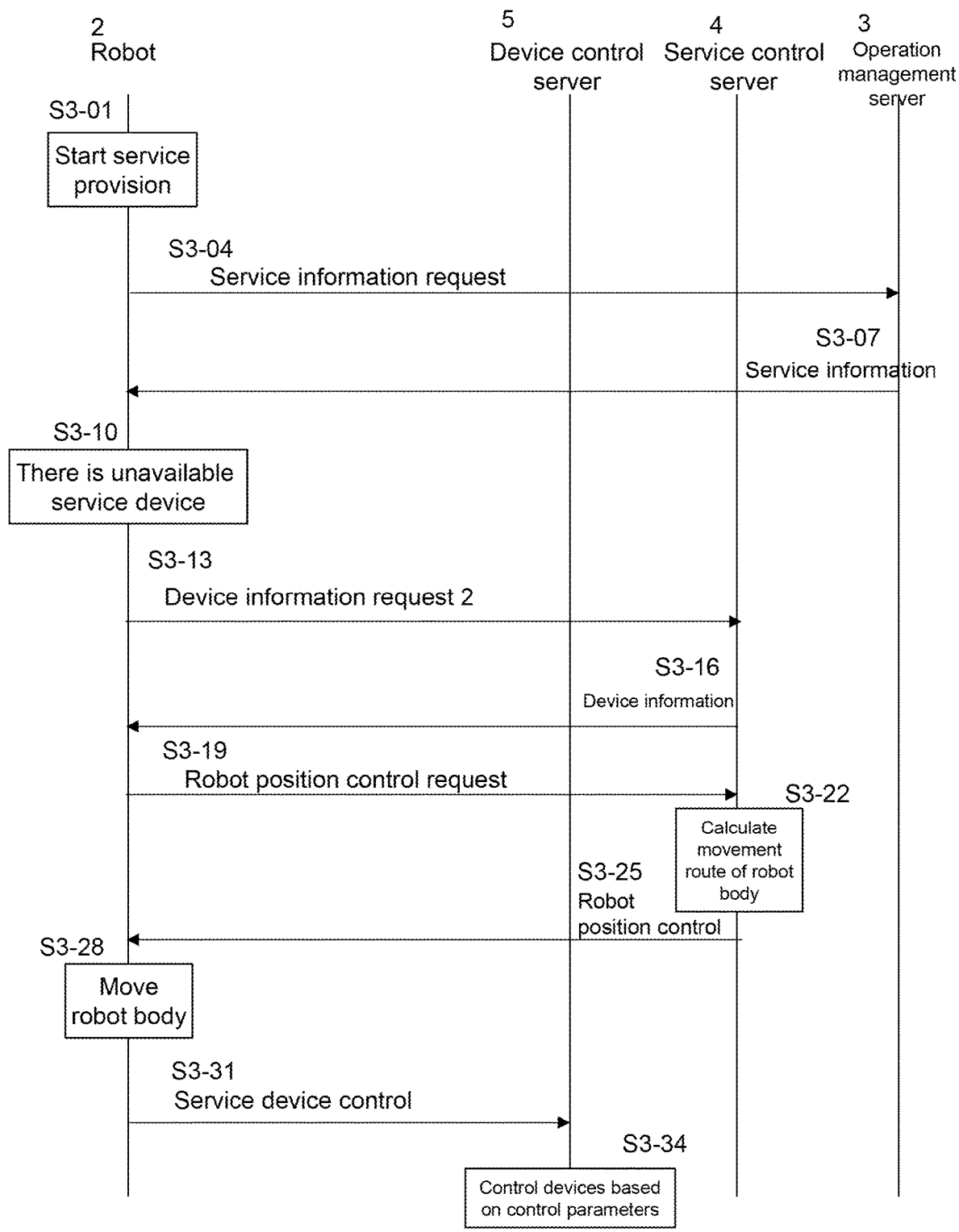
FIG. 12 exemplifies a time-sequence diagram 3 for explaining a service device control process according to an embodiment.

These processes will now be described using FIG. 12.

Figure 11:
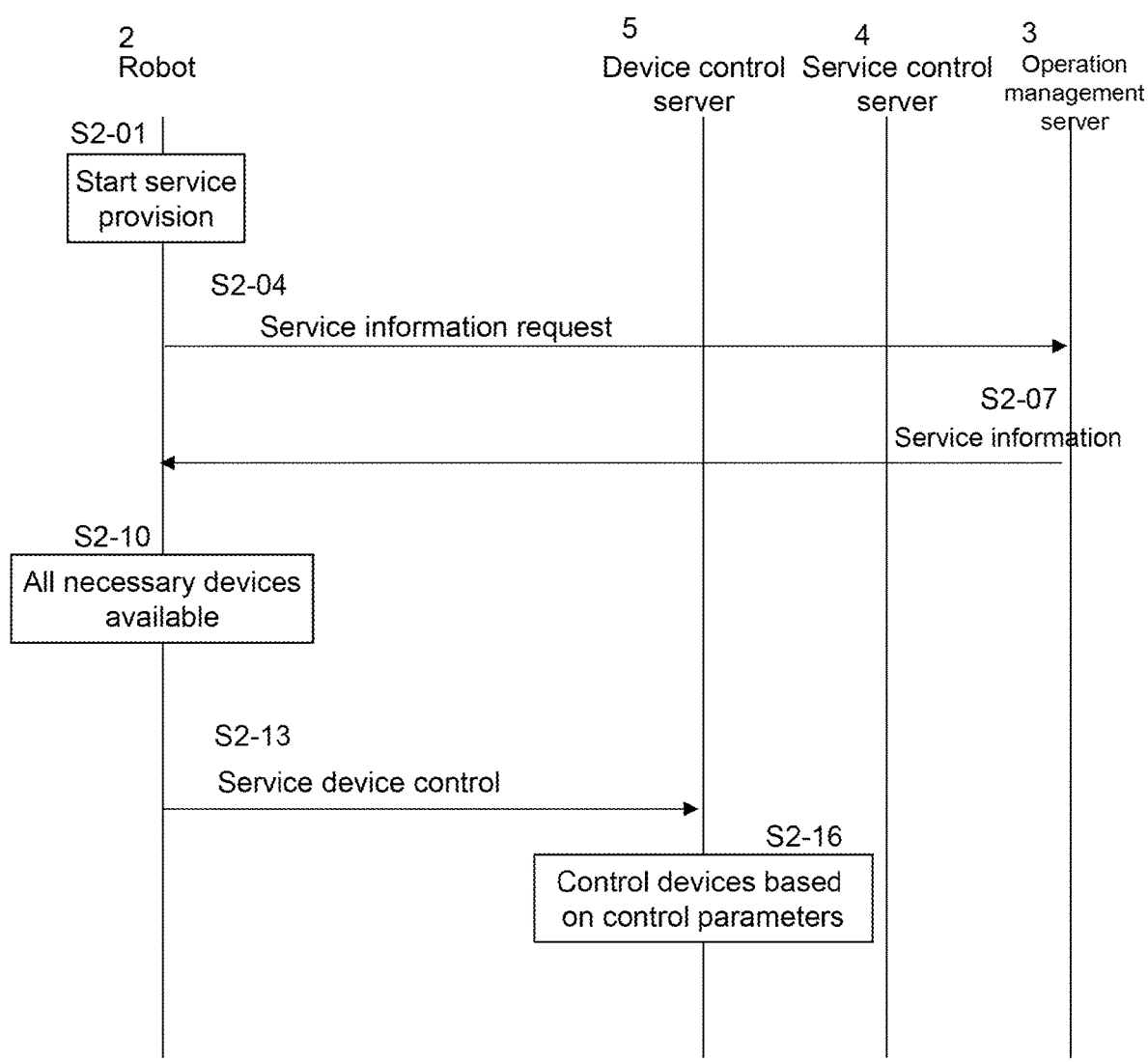
FIG. 11 exemplifies a time-sequence diagram 2 for explaining a service device control process according to an embodiment.

The process from the robot 2 starting provision of a service using some kind of change as a trigger (S3-01) to the robot 2 acquiring service information from the operation management server 3 (S3-07) is the same as steps S2-01 to S2-07 in FIG. 11.

The service scenario control program 263 collates the list of service devices 6 included in the service information with the list of device identifiers managed by the service device information DB 267 and determines whether or not the service can be provided. Let us assume that, as a result of the collation, a part of the list of service devices 6 included in the service information is not included in the list of device identifiers of the service device information DB 267 or, in other words, a part of the service devices 6 is unavailable and the service cannot be provided (S3-10).

In such a case, the robot 2 cannot use the service device 6 due to the following reasons. That is, the robot 2 is at a position where the service device 6 is unavailable and/or the robot 2 does not hold, as information, device control parameters for controlling the service device. In order to resolve this issue, the robot control program 261 of the robot 2 transmits a device information request 2 to the service control server 4 (S3-13).

A format of the device information request 2 (PF-08) is shown in FIG. 14. The device information request 2 includes, as elements, a message type (the device information request 2), a location identifier representing the service location 9 where the robot 2 is in operation, a robot identifier which specifies the robot 2, and a list of device identifiers of the service devices 6 for which information acquisition is requested (device identifier 1 to device identifier N).

The device retrieval program 465 of the service control server 4 having received the device information request 2 searches the location device information DB 467 and extracts information regarding the service device specified by the device identifier, and transmits the information as device information to the robot 2 (S3-16).

After receiving the requested device information on the service device, the robot control program 261 of the robot 2 requests robot position control information from the service control server 4 in order to move to a position where the necessary service device 6 is available (S3-19).

A format of the robot position control information request (PF-07) is shown in FIG. 14. The robot position control information request includes, as elements, a message type (robot position control request), a location identifier representing the service location 9 where the robot 2 is in operation, a robot identifier which specifies the robot 2, an X coordinate and a Y coordinate of the robot 2, and a list of device identifiers of all service devices 6 scheduled to be used by the robot 2 (device identifier 1 to device identifier N). The list of device identifiers of the service devices 6 is consistent with the list of device identifiers included in the service information received in step S3-07.

The robot control program 463 of the service control server 4 having received the robot position control request uses the X coordinate and the Y coordinate of the robot included in the robot position control information request and the device information on the service devices 6 corresponding to the list of device identifiers to calculate a position where the service devices 6 scheduled to be used and included in the list become available.

In addition, the robot control program 463 generates robot position control information including a string of one or more robot motion control commands (motion control command 1 to motion control command N) for moving the robot 2 to the calculated position (S3-22).

The robot control program 463 of the service control server 4 responds to the robot 2 with the generated robot position control information (S3-25).

A format of the robot position control information (PF-05) is shown in FIG. 14. Robot position control information includes, as elements, a message type (robot position control), a location identifier representing the service location 9 where the robot 2 is in operation, a robot identifier which specifies the robot 2, and a list of motion control commands necessary for controlling the robot 2.

By sequentially executing the motion control commands included in robot position control, the robot control program 261 of the robot 2 moves the robot body to a position where all of the service devices 6 scheduled to be used become available (S3-28). Next, service device control similar to that in (S2-10, 13, and 16) in FIG. 11 is performed (S3-28, 31, and 34). However, with respect to service devices 6 which do not satisfy conditions of service provision by position control of the robot 2 alone, in addition to the service device control in (S2-13), service device control for satisfying the conditions of service provision are additionally transmitted to the corresponding device control server 5 (S3-31). Service device control includes a list of device control parameters which ensure service Quality of the service devices 6. Typically, a frame rate, a resolution, a bit rate, and the like of a camera correspond to device control parameters.

The device control program 561 of the device control server 5 controls the service devices 6 based on the supplied device control parameters (S3-34). Accordingly, even when the robot 2 is in a state where external service devices 6 are unavailable, the robot 2 can provide the user with a service by moving the robot body and controlling external devices.

Figure 13:
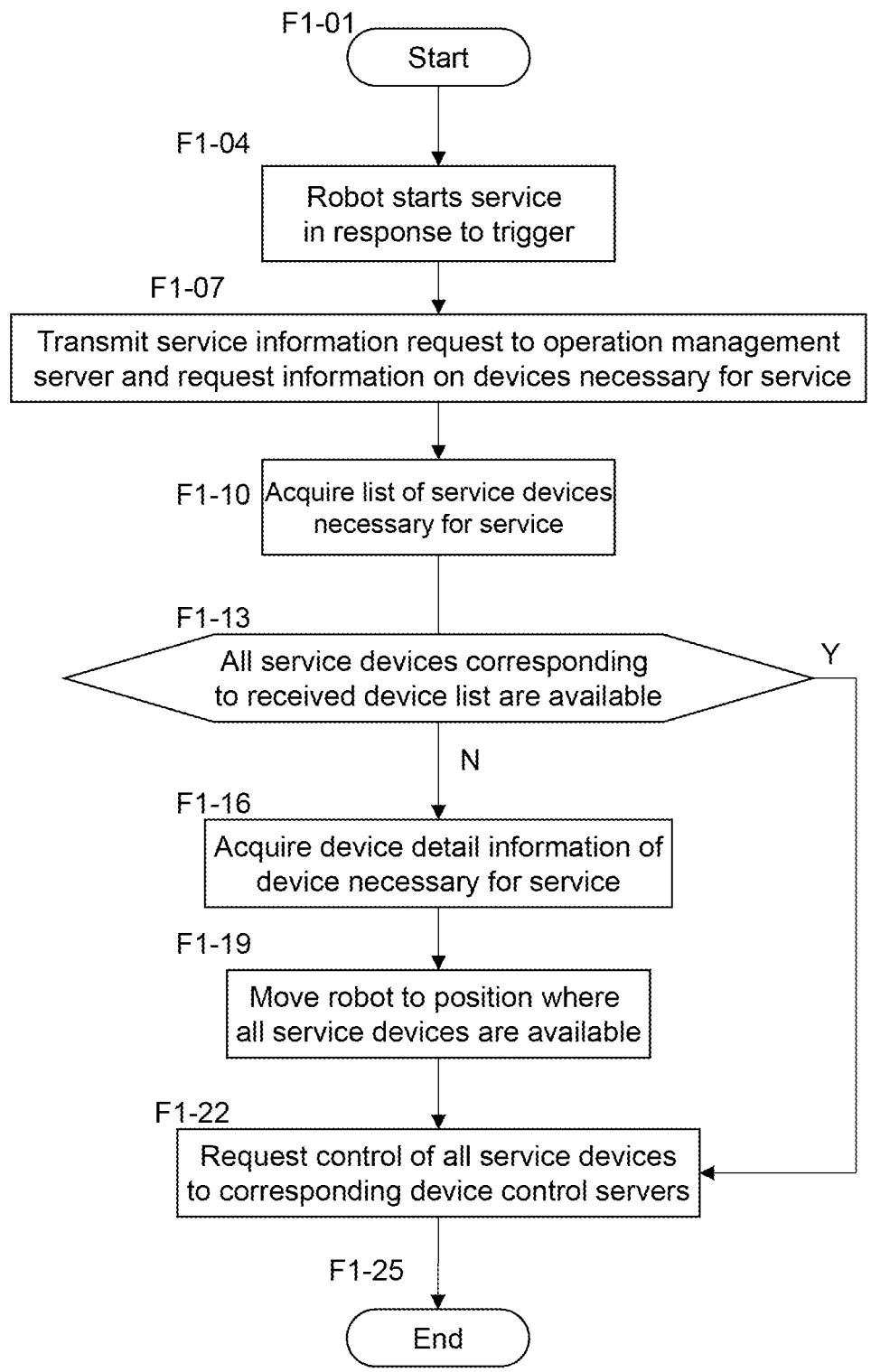
FIG. 13 exemplifies a flow chart for explaining a service device control process according to an embodiment.

Next, overall processing of the service provision system will be explained using the flow chart shown in FIG. 13. The processing starts when, after the system starts operation (F1-01), the robot 2 starts service provision using communication with the user or a detection of a change in a sensor as a trigger (F1-04).

In order to prepare for service provision, the service scenario control program 263 of the robot 2 transmits a service information request to the operation management server 3 (F1-07) and obtains a list of service devices 6 necessary for service provision (F1-10). Subsequently, a determination is made on whether or not all service devices 6 corresponding to the received list are available (F1-13).

When available, service device control is transmitted to the respective device control servers 5 corresponding to all service devices 6 to request control of the devices (F1-22).

When a service device 6 not available at this time point is included in the list of service devices 6 necessary for service provision, the robot control program 261 of the robot 2 transmits the device information request 2 to the service control server 4 and receives device detail information on the service device 6 which is necessary for service provision and which is currently unavailable (F1-16).

When there is a service device 6 not available due to a positional relationship, the robot control program 261 of the robot 2 transmits a robot position control request to the service control server 4 and requests the service control server 4 to move its own robot 2 to a position where all of the service devices 6 required by the robot 2 for service provision become available.

The robot control program 463 of the service control server 4 calculates a position where all of the service devices 6 necessary for service provision become available, generates one or more motion control commands for moving the robot 2 to the calculated position, and transmits the motion control commands to the robot 2.

Due to the robot control program 261 of the robot 2 sequentially executing the received motion control commands, the robot 2 moves to a position where all of the necessary service devices 6 become available (F1-19). When there are service devices 6 which are necessary for service provision but determined to be unavailable due to device control parameters, the robot 2 transmits service device control to the respective device control servers 5 corresponding to the relevant service devices 6 and requests control so that the devices change to an available state (F1-22).

Although the present disclosure has been described with reference to example embodiments, those skilled in the art will recognize that various changes and modifications may be made in form and detail without departing from the spirit and scope of the claimed subject matter.

What is claimed is:

1. A service provision system in which, at a location where one or more service devices are installed, the one or more service devices and a movable device cooperate to provide a user with a service,
    the service provision system comprising a service control server configured to manage device information on each of the one or more service devices, wherein
    the movable device is configured to request, from the service control server, device information indicating if any of the one or more service devices available to the movable device in a state of the movable device indicated by state information,
    the service control server is configured to acquire the device information in the state of the movable device and
    respond to the movable device with the acquired device information, and
    the movable device is configured to manage the acquired device information
    on a condition that a specific service device of the one or more service devices is unavailable due to device control parameters, the movable device requests service device control to a device control server, and
    the device control server using the service device control changes a state of the unavailable specific service devices to an available state.

2. The service provision system according to claim 1, comprising
    an operation management server configured to manage service information indicating a service device necessary for service provision with respect to one or more services, wherein
    the movable device is configured to request, from the operation management server, the service information related to the specific service,
    the operation management server is configured to respond to the movable device with the service information, and
    the movable device is configured to determine, based on the service information and the device information, whether or not the specific service can be provided in the state of the movable device.

3. The service provision system according to claim 2, wherein the device control server configured to control a specific service device necessary for provision of the specific service, the movable device is configured to request, when a result of the determination indicates that the specific service can be provided, the service device control of the specific service device, from the device control server, and the device control server is configured to control the specific service device in accordance with the request.

4. The service provision system according to claim 2, wherein on a condition that a result of the determination indicates that the specific service cannot be provided,
the movable device is configured to request device information on a specific service device necessary for provision of the specific service, from the service control server,
the service control server is configured to respond to the movable device with device information on a specific service device necessary for provision of the specific service,
the movable device is configured to request position control information on the movable device, based on the responded device information on the service device, from the service control server,
the service control server is configured to generate position control information on the movable device and
respond to the movable device with the position control information, and
the movable device is configured to change a state of the movable device so that the specific service can be provided.

5. The service provision system according to claim 1, wherein the state information on the movable device includes positional information, and
the device information includes positional information on the service device which is available to the movable device in the positional information on the movable device.

6. The service provision system according to claim 3, wherein the request for control of the specific service device to the device control server from the movable device includes the device control parameters of the specific service device.

7. A movable device used in a service provision system in which, at a location where one or more service devices are installed, the movable device cooperates with the one or more service devices to provide a user with a service, wherein the movable device:
requests device information indicating if any of the one or more service devices available to the movable device in a state of the movable device indicated by state information, from a service control server configured to manage device information on each of the one or more service devices;
acquires the requested device information from the service control server;
manages the acquired device information;
on a condition that a specific service device of the one or more service devices is unavailable due to device control parameters, the movable device requests service device control to a device control server; and the device control server using the service device control changes a state of the unavailable specific service devices to an available state.

8. The movable device according to claim 7, wherein the movable device requests, from an operation management server configured to manage service information indicating a service device necessary for service provision, the service information related to the specific service, and determines, based on the service information acquired from the operation management server and the device information, whether or not the specific service can be provided in the state of the movable device.

9. The movable device according to claim 8, wherein when a result of the determination indicates that the specific service can be provided, the movable device requests the device control server, configured to control a specific service device necessary for provision of the specific service, to control the specific service device using the service device control.

10. The movable device according to claim 8, wherein one a condition that a result of the determination indicates that the specific service cannot be provided,
the movable device requests device information on a specific service device necessary for provision of the specific service, from the service control server,
the movable device requests, from the service control server, position control information on the movable device based on the device information on the service device acquired from the service control server,
the movable device acquires the position control information from the service control server, and
the movable device changes a state of the movable device so that the specific service can be provided.

11. A service control server used in a service provision system in which, at a location where one or more service devices are installed, the one or more service devices and a movable device cooperate to provide a user with a service, wherein the service control server manages device information on each of the one ore more service devices, and
when device information indicating if any of the one or more service devices available to the movable device in a state of the movable device is requested from the movable device,
the service control server acquires the device information in the state of the movable device
responds to the movable device with the acquired device information,
on a condition that a specific service device of the one or more service devices is unavailable due to device control parameters, the movable device requests service device control to a device control server, and
the device control server using the service device control changes a state of the unavailable specific service devices to an available state.

12. The service provision server according to claim 11, wherein when device information on a specific service device necessary for provision of the specific service is requested from the movable device,
the service control server responds to the movable device with device information on a specific service device necessary for provision of the specific service, and
when position control information on the movable device based on the responded device information is requested from the movable device, the service control server generates position control information on the movable device and responds to the movable device with the position control information.

* * * * *